Dec. 13, 1938.  E. A. MURPHY ET AL  2,140,026
CELLULAR RUBBER AND METHOD OF MAKING THE SAME
Filed Sept. 26, 1935
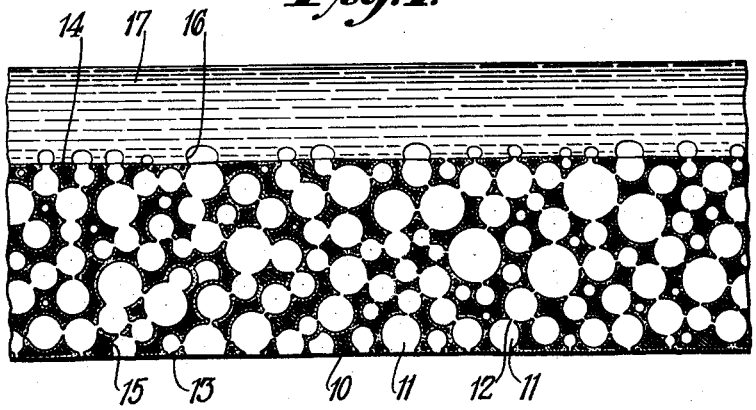
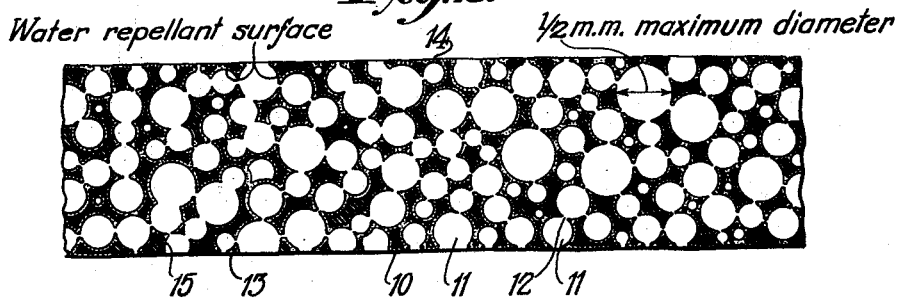
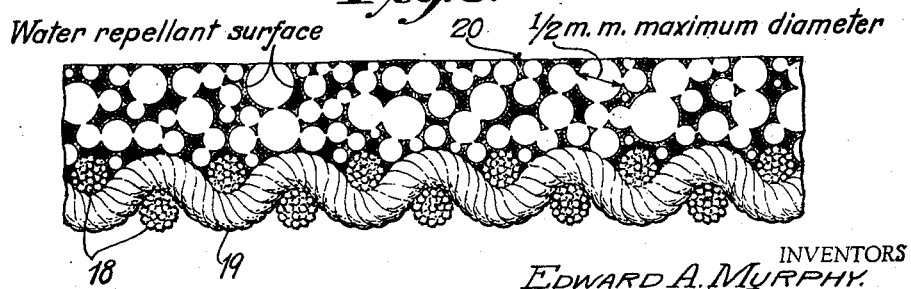
INVENTORS
EDWARD A. MURPHY.
BY EVELYN W. MADGE.
ATTORNEYS Patented Dec. 13, 1938

2,140,026

UNITED STATES PATENT OFFICE 2,140,026

CELLULAR RUBBER AND METHOD OF MAKING THE SAME

Edward Arthur Murphy and Evelyn William Madge, Birmingham, England, assignors to Dunlop Rubber Company Limited, London, England, a British company Application September 26, 1935, Serial No. 42,276
In Great Britain December 6, 1934

7 Claims. (Cl. 18—53)

This invention comprises improvements in or relating to the manufacture of goods of or containing sponge-like or cellular rubber or similar material of the kinds hereinafter specified.

Processes have heretofore been proposed for the manufacture of goods of rubber or similar material of sponge-like or cellular structure from aqueous dispersions of rubber or the like as for instance by converting the aforesaid dispersions into a frothy condition wherein the froth comprises a gas and the emulsions or dispersions aforesaid are still in the reversible condition and thereafter causing the frothy mass to set to a permanent structure of irreversible solid material. In such processes aqueous dispersions of rubber or the like can be employed which are or have been rendered capable of gelling on the application of heat or to which substances have been added to cause the dispersions to gel in the cold after a definite and controllable time interval.

It has also been proposed to provide textile fabrics with a coating or layer of rubber which includes the steps of applying to the fabric a layer of a continuous relatively stable aqueous foam containing a rubber latex as the rubber constituent thereof, drying the foam whereby a porous rubber layer is formed and compressing the dried layer to decrease its porosity to the desired extent.

In this prior proposal it has further been disclosed that the rubber can be vulcanized and that the dried porous layer can be compressed to an extent sufficient to yield a substantially non-porous waterproof coating on the fabric. The porous coating absorbs water and when the coated surface is wetted the water penetrates through to the underside of the fabric. To make the coating waterproof the dried material is washed and subjected to pressure as by passage between rollers. Alternatively, the raw material can be compressed to destroy the air cells and then washed to remove the soap. It is stated that the finished rubberized fabric, whether the coating is porous or homogeneous throughout, has a soft "feel" and is not so characteristically "rubbery" as rubberized fabrics prepared in the ordinary way.

The object of the present invention is to produce goods comprising fibrous material and cellular unmasticated rubber which are porous to gases and vapours and impenetrable to a small head of aqueous liquids, suitable for example for waterproof garments or waterproof linings, shoe linings and shoe construction in general.

According to the present invention, the aforesaid goods comprise fibrous materials as, for example, textile or felted fibrous materials and cellular unmasticated rubber having cells of relatively small pore size and being conditioned by materials which make rubber water-repellent.

According to the present invention, in a process for the manufacture of goods of or containing rubber or similar material of sponge-like or cellular structure from foamed aqueous emulsions or dispersions of the kinds hereinafter specified, the foamed aqueous emulsions or dispersions aforesaid employed have cells of relatively small size and the cell surfaces of the dried foam structure is water repellent. The cell or pore surfaces are made water repellent in any suitable way. For example, the aqueous dispersion may contain in admixture therein materials or reagents which make rubber water-repellent or may first be converted into cellular unmasticated unvulcanized rubber which is then contacted, as by soaking, with molten or otherwise liquefied materials which make the rubber surfaces water-repellent.

Suitable materials or reagents which make rubber water-repellent are solid organic materials which have a high angle of contact with respect to water. Such materials are the higher members of the homologous series i. e. paraffins, esters, fatty acids, alcohols: such substances as zinc stearate, magnesium stearate, i. e. the solid salts of the fatty acids, chlorinated compounds such as "Halowax" (a registered trade-mark). In general, amounts of 25% and upwards on the rubber should be employed but this should not be considered as a limiting quantity as it will vary with the type of wax or other water-repellent material used.

It is also to be understood that satisfactory results depend to a great extent on the bubble size of the sponge layer. Hence the froth employed should not be of a very low density, that is, frothing of the aqueous dispersions should be carried out until the final bubble size is not greater than about half a millimetre or of that order of magnitude, or mixings should be used which favor the formation of small bubbles, for example, a latex mixing containing zinc oleate can usefully be employed for this purpose.

By the term "fibrous materials" are included for example absorbent or porous papers, a plurality of parallel cords, woven material, lengths of carded cotton web, or carded webs of wool and felted materials.

The emulsions or dispersions which are to be converted into a frothy condition wherein the froth comprises a gas and the emulsions or dispersions aforesaid still in the reversible condition comprise those consisting of or containing rubber, gutta-percha, balata, or similar vegetable resins occurring naturally or artificially obtained and in vulcanized or unvulcanized condition. All of such materials are included herein under the generic term, "rubber."

Such artificial aqueous dispersions may include those of coagulated rubber, vulcanized rubber, synthetic rubber. waste or reclaim.

If desired, any of the aforementioned dispersions may be used alone or in admixture with one another.

Any of the aforesaid dispersions may contain the usual known compounding ingredients and/or may be in concentrated form.

Concentrates such as are obtained in Patent No. 1,846,164 and in British Patent 219,635 to which may be added any one or more of the usual compounding ingredients preferably excepting those which would tend to form insoluble soaps or to increase the surface tension of the mixture may also be used.

Aqueous emulsions or dispersions which are or which can be rendered capable of gelling on the application of heat or to which substances can be added to cause the aqueous emulsions or dispersions to gel in the cold after a definite and controllable time interval can also be used.

The emulsions or dispersions which have been converted into a frothy condition according to British Patents 332,526, 411,202 and United States Patent.1,852,447 are of particular use in carrying out the present invention.

It is to be understood that in carrying out the process of the present invention the aforesaid frothed aqueous emulsions or dispersions are to have bubbles of small size and may be in admixture with a substantial proportion of material or reagents which make rubber water-repellent.

If desired, the products produced according to the present invention can be treated with for instance soap insolubilizing reagents such as aluminum salt solutions to enhance their waterproof nature.

An example of a suitable latex mixing which can be employed in carrying out the present invention is one of about 60% solid content and of the following composition:—

| | Parts by weight |
|---|---|
| Rubber | 100 |
| Casein | 0.5 |
| Sulphur | 2.75 |
| Zinc diethyldithiocarbamate | 1.0 |
| Mineral oil | 20.0 |
| Ceresin wax | 25.0 |

This mixing can be frothed with a small amount of soap.

After mixing has been spread on to the fibrous material it is coagulated and vulcanized in known manner. The resulting cell walls are water repellent. In the case of a cellular structure made of a composition such as described in Patent No. 1,852,447, the cell walls may be rendered water repellent by coating with a water repellent material after the cell structure has been formed.

Fig. 1 is a conventional or diagrammatic cross section of a porous rubber sheet made according to our invention and showing approximately the relation of the water repelling surface to a superposed layer of water.

Fig. 2 is a similar section omitting the water, and

Fig. 3 is a section of similar type through a fabric covered with the porous rubber of our invention.

In the rubber layer as represented diagrammatically in the cross sections of Figs. 1 and 2, the mass of rubber 10 is filled with bubble-like spaces 11 which adjoin one another, the walls between adjacent bubbles being interrupted or broken to form passages such as that indicated at 12. In this way, continuous passages may be formed in more or less indirect paths from one face 13 of the layer to the opposite face 14. It will be understood that communication is similarly afforded sidewise so that the passages are to a greater or less extent inter-connected. The bubble spaces while being in general not above one-half a millimeter in diameter, may be lower than this dimension. This is indicated partly in the sections of Figs. 1 and 2, the different sizes shown also being accounted for by the fact that the section will intersect some of the spaces equatorially, and the others on planes parallel to the mid or equatorial plane.

Each pore is provided with a surface or coating 15 that is repellent to water, having a high angle of contact therewith. This is indicated in Fig. 1 by the space 16 in the layer of water 17. It will be understood that the layer of water is shown as only one example, the porous material being also capable of shedding water present in the form of drops of moisture. Thus it will be apparent that although there are innumerable air or gas passages from one side of the layer to the other, the surface tension of the water combined with the repellent nature of the coatings or surfaces of the air pores, will not permit the water to pass through the pores of small size indicated except under considerable pressure.

A similar section is shown in Fig. 3 of a fabric formed of warp and woof threads 18 and 19 loosely woven to provide pores and covered or coated with a layer 20 of porous rubber having the same construction as that of Figs. 1 and 2. The action of these pores in the coated fabric is similar to that of the construction shown in Figs. 1 and 2, permitting the passage of air or gas by repelling the passage of water in the liquid phase.

What we claim is:

1. A process for the manufacture of cellular rubber from aqueous dispersions thereof which comprises forming said aqueous dispersions into a foam having pores not exceeding about ½ a millimeter in diameter, setting and drying said foam to form a cellular rubber structure, and providing at the surfaces of said cells a water repellent material comprising solid organic compounds having a high angle of contact with respect to water.

2. A process for the manufacture of cellular rubber from aqueous dispersions thereof which comprises forming said aqueous dispersions into a foam having pores not exceeding ½ a millimeter in diameter, setting and drying said foam to form a cellular rubber structure, and providing at the surfaces of said cells a water repellent material that is a member of the class constituting the higher members of the homologous series comprising paraffins, esters, fatty acids and insoluble salts of fatty acids.

3. A process for the manufacture of cellular rubber from aqueous dispersions thereof which comprises forming said aqueous dispersions into a foam having pores not exceeding about ½ a millimeter in diameter, setting and drying said foam to form a cellular rubber structure, and providing at the surfaces of said cells a water repellent material, said dispersions containing oleate.

4. Cellular unmasticated rubber permeable to gases and having cell pores of a size not exceeding about ½ a millimeter in diameter, the surfaces of said pores being coated with a solid water repellent material having a high angle of contact with respect to water.

5. Cellular unmasticated rubber containing fibrous material and having pores of a size not exceeding about ½ a millimeter in diameter, and having surfaces rendered water repellent by a solid organic compound having a high angle of contact with respect to water.

6. Foamed latex rubber having cells not exceeding about ½ a millimeter in diameter, and having surfaces rendered water repellent by a solid organic compound having a high angle of contact with respect to water.

7. The article of claim 4 in which the solid organic compound is a member of the class constituting the higher members of the homologous series comprising paraffins, fatty acids and insoluble metallic salts of the fatty acids.

EDWARD ARTHUR MURPHY.
EVELYN WILLIAM MADGE.